Patented Apr. 13, 1954

2,675,328

UNITED STATES PATENT OFFICE 2,675,328

PREPARATION OF METAL SULFONATE COMPOSITIONS

Thomas J. Wishlinski, Lansing, Ill., and Frederick W. Schuessler, Valparaiso, Ind., assignors to Standard Oil Company, Chicago, Ill., a corporation of Indiana No Drawing. Application May 25, 1951, Serial No. 228,374

18 Claims. (Cl. 106—278)

This invention relates to an improved process for manufacturing petroleum sulfonate compositions and bituminous compositions containing same. More particularly, it relates to the manufacture of stabilized water-insoluble metal sulfonate containing adjuncts for bituminous coating materials such as paving asphalts.

Bituminous materials, such as normally liquid road oils and normally liquid to normally solid asphalts, are frequently compounded with various adjuncts to improve the adhesiveness of the bitumen to wet mineral aggregates. Among the various adjuncts employed for this purpose are soaps of sulfonic acids, particularly the alkaline earth metal and heavy metal soaps of sulfonic acids obtained in the treatment of hydrocarbon oils with concentrated or fuming sulfuric acid. One source of such sulfonic acids is the sludge obtained in the treatment of hydrocarbon oils with sulfuric acid of about 95 percent strength or above, and preferably fuming sulfuric acid. It is an object of the present invention to provide a method of preparing stable, homogeneous adjuncts for incorporation in paving asphalts and the like containing water-insoluble sludge acid soaps.

A further object of the invention is to provide a method of preparing a stable homogeneous metal sulfonate containing adjunct for bituminous materials comprising an aromatic hydrocarbon and water-insoluble metal sulfonates derived from an acid sludge resulting from the treatment of a hydrocarbon oil with concentrated or fuming sulfuric acid.

Still another object of the invention is to provide a method of preparing a stable homogeneous adjunct comprising a substantial proportion of a water-insoluble metal sulfonate obtained from an acid sludge, resulting from the treatment of a hydrocarbon oil with concentrated or fuming sulfuric acid, an aromatic hydrocarbon, water, alcohol and mineral oil which may be added to a bitumen to promote coating of wet aggregates. A still further object is to provide a method of transforming useless heterogeneous mixtures of such substances into stable, homogeneous adjuncts of substantial value and effectiveness. Other objects and advantages of the present invention will become apparent from the following description.

It has been discovered previously by our coworkers that a composition comprising the water-insoluble metal soaps of preferentially water-soluble sulfonic acids derived from acid sludge, an aromatic hydrocarbon, alcohol, a small amount of water and some mineral oil is particularly suitable as an adjunct for bituminous paving materials. Such a novel composition and a method of preparing same are described in copending application for Letters Patent Serial No. 108,428, filed August 3, 1949.

Briefly stated, a novel process is described in the copending application wherein a hydrolyzed sludge resulting from acid treatment of a technical white oil or the like with concentrated or fuming sulfuric acid is diluted with more than about 3 volumes of water for each volume of hydrolyzed acid sludge and mixed with sufficient basic compound to neutralize the sulfonic acids present therein; the precipitated sulfonates are then removed from supernatant liquid and mixed with 25 percent to about 75 percent of an aromatic hydrocarbon having a boiling point of at least about 220° F. following which the aromatic hydrocarbon-sulfonate mixture is dehydrated to a water content of not more than about 35 percent and there is added to the dehydrated mixture from about 2 percent to 15 percent of an aliphatic alcohol. That process usually results in stable homogeneous sulfonate compositions but it has been found that for some unknown reason such compositions are at times unstable and settle in a non-homogeneous two phase mixture. In order to assure consistent production of a stable, uniform composition, containing water-insoluble soaps of preferentially water-soluble acids derived from any sludge obtained in the manner hereinafter described it has been found desirable to incorporate preferentially oil-soluble sulfonic acids or their soaps such as mahogany acids or their soaps, to the composition at some stage in the manufacturing process. The improvement of this invention may be employed in the production of stable sulfonate compositions from the acids obtained from any sludge obtained in the manner hereinafter described, as a stability assurance factor, or it may be employed, if preferred, only when it is apparent that such is required because of ultimate production of an unstable heterogeneous product.

In accordance with the present invention a stable homogeneous composition containing a water-insoluble metal salt of sulfonic acids derived from acid sludge resulting from the treatment of hydrocarbon oils such as lubricating oil distillates, with sulfuric acid of at least 95 percent strength, may be obtained by forming such metal sulfonates in situ in the hydrolyzed acid sludge in the manner hereinafter described. To a sludge of the type described above is added an amount of mahogany acid of from about 0.5 to about 35 weight percent, preferably from about 5 to 20 percent. Following this the acid sludge is hydrolyzed and settled to permit stratification with sulfuric acid resulting from the hydrolysis. The stratification and subsequent removal of the sulfuric acid (both unreacted and that resulting from the decomposition of sulfuric acid esters) from the liver is commonly referred to as hydrolysis of the sulfuric acid sludge and such portion shall be hereinafter solely referred to. While it has been found advantageous to incorporate oil-soluble mahogany acids in the sludge prior to hydrolysis of the sludge, the acid or the soap thereof may be incorporated at other stages in the process since the stage at which such is incorporated is not critical in this invention. After withdrawing the sulfuric acid the remaining portion of the acid sludge, commonly referred to as "liver," is diluted with water. It is important that the "liver" be sufficiently diluted with water at this point prior to the neutralization step, since in a properly diluted "liver" the metal sulfonate formed upon neutralization is preferentially precipitated rather than the metal sulfate thus resulting in a metal sulfonate of low inorganic salt content. The dilution required to obtain the preferential precipitation of the metal sulfonate is dependent upon the concentration of sulfonic acid and sulfuric acid in the "liver." In general, the "liver," or separated hydrolyzed sludge, should be diluted with more than about 3 volumes of water, and preferably at least 5 volumes of water for each volume of "liver." The diluted "liver" is then heated to a temperature of from about 90° F. to about 200° F. and preferably from about 120° F. to about 150° F. and the sulfonic acid is neutralized with a suitable neutralizing agent. The oil-soluble mahogany acids may be added to the diluted "liver" prior to neutralization in an amount equal to that set forth above for addition to the sludge prior to hydrolysis but care must be taken to maintain the required dilution. The metal soaps of the mahogany acids may be added to the sludge if they are more readily available, as is the case in many refineries, otherwise the acid is added and neutralized along with the sludge acids. If addition of the sulfonic compound is made after neutralization, it is preferred that the soaps, rather than the acids, be added. Suitable neutralizing agents for use herein are, for example, an oxide, hydroxide or carbonate of the desired metal, for example, an alkaline earth metal such as calcium, strontium, barium or a heavy polyvalent metal such as lead, iron, zinc, copper, cobalt, manganese, etc. although the alkaline earth metals, particularly calcium, are preferred. Other suitable neutralizing agents are basic nitrogenous compounds, such as, for example, ammonia toluidine, etc. The neutralizing agent is preferably added in the form of a slurry and the reacting mixture agitated such as by air blowing to accelerate the reaction and prevent excessive settling of the neutralizing agent. After the desired amount of the neutralizing agent has been added, the precipitated metal sulfonate is allowed to settle and the supernatant liquid drawn off, the aromatic hydrocarbon of the type hereinafter disclosed is added to the crude sulfonate mixture in amounts of from about 25 percent to about 75 percent by weight, and preferably from about 35 percent to about 60 percent by weight. After the crude sulfonate and the aromatic hydrocarbon are well mixed, sufficient neutralizing agent is added to completely neutralize the residual acidity of the material. The neutralized mixture of sulfonate and aromatic hydrocarbon is dehydrated to lower the water content to from about 1 percent to about 35 percent, and preferably from about 3 percent to about 10 percent. Whereas the neutralization of the sludge acids can not be carried out, according to the present invention, with sodium hydroxide or other base which yields a preferentially water-soluble soap, the sodium soap of the preferentially oil-soluble sulfonic acid may be employed advantageously.

The extent to which the neutralized product is dehydrated will depend to some extent upon the type of alcohol used. For example, when using alcohols of up to about five carbon atoms dehydration to a water content of from about 1 percent to about 10 percent is desirable, whereas when using higher alcohols, such as, for example, nonyl alcohol, cetyl alcohol, etc., dehydration to a water content of about 35 percent will be sufficient to prevent phase separation. The dehydrated mixture is cooled to a temperature of at least about 150° F. and the mixture diluted with from about 2 percent to about 15 percent, and preferably from about 4 percent to about 8 percent of the aliphatic alcohol. After settling to remove excess amounts of inorganic salts, which may still be present, the mixture is ready for storage, or for compounding with the bitumen material. In the event it is preferred to add the oil-soluble soaps only when absolutely needed it is at this point that the need will be apparent if a heterogeneous mixture exists. When such is the case, oil-soluble soap addition, made at this point in the process, will result after agitation of the mixture, in a homogeneous composition.

It is important that the finished mixture contain not more than the maximum amount of water indicated above since the presence of larger amounts of water will increase the danger of a phase separation of water, alcohol, and soap mixture from the aromatic hydrocarbon. However, when the amount of water present is maintained within the above-mentioned limits a stable homogeneous product may be obtained with the addition of a minimum amount of oil-soluble soap.

The sulfonate composition obtained in the manner described contains essentially the following components in the following approximate proportions:

|  | Range (Percent) | Preferred Range (Percent) |
|---|---|---|
| Metal sulfonate of preferentially water-soluble sludge acid. | 10 to 50 | 20 to 30. |
| Aromatic hydrocarbon | 25 to 75 | 35 to 60. |
| Aliphatic alcohol | 2 to 15 | 4 to 8. |
| Water | 1 to 35 | 3 to 10. |
| Hydrocarbon oil | 1 to 30 | 5 to 10. |
| Metal sulfonate of added oil-soluble sulfonic acids. | .05 to 18 | 1 to 6. |

Aromatic hydrocarbons suitable for use in accordance with the present invention are preferably those having a boiling point above about 220° F. at atmospheric pressures and includes mono-nuclear aromatic hydrocarbons, such as the xylenes, and poly-nuclear or condensed ring aromatics, such as naphthalenes, alkylated naphthalenes, such as methylated naphthalenes and ethylated naphthalenes, and mixtures of the higher boiling mono-nuclear aromatic hydrocarbons and poly-nuclear hydrocarbons.

A preferred source of mixed aromatic hydrocarbons suitable for use in the present invention is a light catalytic cycle stock obtained from a catalytic hydrocarbon cracking operation in which gas oil or heavier hydrocarbons, such as reduced crude, are cracked at a temperature of about 800° F. to 1050° F. at a pressure of about atmospheric to 50 pounds per square inch in the presence of suitable catalysts, such as for example, silica-alumina, silica-magnesia, and other well-known cracking catalysts. A method of conducting a fluidized catalytic cracking operation is described in U. S. 2,341,193, issued to Fred W. Scheineman, February 8, 1944. The fraction suitable for use in the present invention is a heavier-than-gasoline fraction usually recycled to cracking. These fractions, depending upon their boiling range, are commonly referred to as light cycle stock and heavy cycle stock. A catalytic light cycle stock particularly well suited for this invention is a fraction having an aromatic content of at least about 40 to about 50 percent, and a distillation range between about 425° F. and about 560° F. A typical analysis of a suitable light catalytic cycle stock shows the material to be composed substantially of about 10 percent normal $C_{12}$ to $C_{20}$ paraffins, about 45 percent of other paraffins and naphthenes, about 5 percent mono-nuclear aromatics which are mainly mono- to hexa-alkylated benzenes, and about 40 percent poly-nuclear aromatics which are mainly alkyl naphthalenes, largely methylated naphthalenes. A typical light catalytic cycle stock will give the following A. S. T. M. distillation:

| | |
|---|---|
| Initial boiling point | ° F__ 430 |
| 10% over | ° F__ 448 |
| 50% over | ° F__ 478 |
| 90% over | ° F__ 518 |
| Maximum boiling point | ° F__ 552 |

While we prefer to use a light cycle stock from a catalytic cracking operation of the type above-described, hydrocarbon fractions from other catalytic hydrocarbon conversion processes or thermal hydrocarbon conversion processes are suitable provided they have a sufficiently high aromatic content, at least 40 to 50 percent, and have suitable distillation characteristics, i. e. boiling above about 220° F.

In place of using the whole catalytic cycle stock we may extract the aromatic components from the cycle stock and use the aromatic extract. The aromatics may be extracted by extraction with the usual and known solvents, such as for example, liquid hydrogen fluoride, nitromethane, liquid sulfur dioxide, etc.

Other mixed aromatic hydrocarbons suitable for use in the present invention are mixtures of aromatic hydrocarbons produced by the catalytic conversion of aliphatic hydrocarbons by the so-called hydroforming process. This mixture is known in the petroleum refining art as "catalytic reform naphtha bottoms," "hydroformer polymers," or "hydroformer bottoms." They will be referred to hereinafter as "hydroformer polymers". A process by which the hydroformer polymers are obtained is described in U. S. Patent No. 2,320,147. Briefly, the process comprises treating virgin or cracked naphtha or mixtures thereof with a solid porous hydroforming catalyst such as an oxide of a metal of group II to IV of the periodic system, such as the oxide of chromium or molybdenum, suitably supported on alumina or magnesia. The conversion is suitably carried out at a temperature of 850° F. to 1050° F. and, if desired, in the presence of hydrogen. The hydroformer products are fractionated by taking overhead a catalytically reformed gasoline of suitable end point and recovering the higher boiling materials as bottoms, which boil from about 400° F. to about 750° F., and have gravities of from about 10° API to about 18° API. A typical vacuum distillation of a hydroformer sample having a gravity of about 12° API shows the following composition:

| Fraction | Components |
|---|---|
| 0-2% | Toluene. |
| 2-8% | Xylenes. |
| 8-14% | 1, 3, 5-Trimethylbenzenes. |
| 14-17% | 1, 3, 4-Trimethylbenzenes. |
| 17-22% | 1, 2, 3-Trimethylbenzene. |
| 22-27% | Tetramethylbenzene. |
| 27-37% | Naphthalenes. |
| 37-59% | Monomethylnaphthalenes. |
| 59-61% | Diphenyl. |
| 61-74% | Dimethylnaphthalenes. |
| 74-78% | Methyldiphenyls. |
| 78-83% | Trimethylnaphthelenes. |
| 83-87% | Fluorene. |
| 87-89% | Methylfluorenes. |
| 89-94% | Anthracene and Phenanthrene. |
| 94-97% | Methylanthracenes and Methylphenanthrenes. |
| 97-98% | Pyrene. |
| 98-100% | Tetracyclics and Higher. |

A representative hydroformer bottoms fraction exhibits the following physical properties:

| | |
|---|---|
| API gravity | 11-22 |
| Refractive index $n_D^{20}$ | 1.5911 |
| Specific dispersion | 264 |
| ASTM distillation: | |
| Initial | ° F__ 448 |
| 10% | ° F__ 465 |
| 20% | ° F__ 472 |
| 30% | ° F__ 477 |
| 40% | ° F__ 484 |
| 50% | ° F__ 490 |
| 60% | ° F__ 501 |
| 70% | ° F__ 516 |
| 80% | ° F__ 545 |
| 90% | ° F__ 620 |
| Max. (92% off) | ° F__ 750 |

Either the entire hydroformer polymer or lower boiling fractions thereof, such as the 0 to 90 percent fraction boiling between about 400° F. and 600° F. or the 0 to 50 percent fraction boiling between about 400° F. and 500° F. may be used.

The alcohol employed in the present invention is an aliphatic alcohol, such as for example, ethyl alcohol, propyl alcohol, isopropyl alcohol, butyl alcohol, and amyl alcohols, such as tertiary amyl alcohol. Higher alcohols of 9 to 16 carbon atoms and higher are not precluded; nonyl alcohol has been found to be operable.

While the preferentially water-soluble sulfonic acids employed in this invention may be obtained from acid sludges resulting from the treatment of viscous hydrocarbon oils having Saybolt Universal viscosity of from 80 seconds to 900 seconds at 100° F. with 0.5 to 9 pounds of concentrated or fuming sulfuric acid per gallon of oil being treated, it is preferred to employ the acid sludges obtained in the treatment of hydrocarbon oils having a Saybolt Universal viscosity at 100° F. of from about 100 seconds to about 150 seconds with 2 to 4 pounds of fuming sulfuric acid per gallon of oil being treated.

The oil-soluble sulfonic compounds which may be employed according to the present invention are those which remain primarily in the oil layer following the removal of the acid sludge resulting from the treatment of an oil with sulfuric acid of 95 percent concentration or above. These sulfonic compounds can be removed from the oil by neutralizing the acid treated oil with an alkaline agent such as ammonia or an alkali, preferably sodium hydroxide to form the corresponding sulfonic acid soaps which are then extracted from the oil with 50 percent to 80 percent aqueous alcohol solutions or other suitable means. Because of their characteristic mahogany color these sulfonates are known in the petroleum art as mahogany soaps. They usually contain about 35 to 50 percent of the actual soap mixed with oil, water and a small amount of salts, such as sodium sulfate, which are difficult to remove. While most of the preferentially oil-soluble sulfonates are obtained from the acid-treated oil by neutralization with alkali, some of these soaps can be recovered from the acid sludge by suitable solvents.

The preferentially oil-soluble sulfonic acids have equivalent weights in the range of from about 350 to about 600 and they vary, according to their equivalent weight, from highly oil-soluble products in the heavier materials to products which in the lower equivalent weight range tend toward preferential water-solubility. Since the sulfonic acids and their soaps vary over wide ranges of equivalent weights and corresponding oil and water-solubilities it should be understood that there is no clearly definitive line of demarcation between preferentially oil-soluble and preferentially water-soluble materials; because of this, it is possible only to broadly define proper equivalent weight ranges and to urge the requirement of preferential oil-solubility. This is particularly true in view of the fact that some prefentially water-soluble sulfonic acids have equivalent weights falling within the range set forth above for preferentially oil-soluble acids.

The present invention will be more fully described and understood by reference to the following specific examples which are illustrative and in no way intended to limit the scope of the invention.

Example I 17,000 gallons of liver (obtained by hydrolyzing the total sludge and separating the weak acid) were diluted with water to a volume of about 85,000 gallons. A lime slurry of 15,500 pounds of lime in 62,500 pounds of water was then pumped in and the mixture was agitated. The amount of lime slurry used was slightly in excess of that required for the complete neutralization of the total sulfonic acids present but insufficient to completely neutralize the total acidity. The mixture was allowed to settle, after addition of the lime was complete and two layers formed. The upper layer of slightly acid water was removed and there was added 15,000 gallons of catalytic cycle stock to the lower layer comprising calcium sulfonate. An additional slurry of 600 pounds of lime in 6000 pounds of water was then added to render the mixture slightly alkaline. Having added the cycle stock, dehydration of the mixture was begun. During the entire hydration step a two phase system existed whereby about 50 percent of the total light catalytic cycle stock added remained as a separate top phase. When about 6.5 percent water content was reached the bottom phase became so viscous that it could not be pumped, agitated or sampled. Efforts to bring the total mix into a homogeneous composition by adding a large amount of isopropanol failed. At this point approximately 8000 gallons of separated mix present in one dehydrating vessel were steamed for 16 hours with open steam to increase the water content and render the bottom phase more pumpable. A rough analysis of the mix after the steaming showed the following:

|  | Per cent |
|---|---|
| Calcium sulfonate (sludge acid sulfonate) | 27 |
| Light catalytic cycle stock | 50 |
| Water | 8 |
| Salts, free lime, oil | 15 |

To this mixture were then added 800 gallons of sodium mahogany soap having an analysis as follows:

|  | Per cent |
|---|---|
| Soap | 47.7 |
| Oil | 45.5 |
| Water | 2.9 |

After agitation of the mixture a stable one phase system existed. Dehydration to about 3.6 percent water was then effected and about 12 percent isopropanol was added.

Example II 2.9 pounds of mixed three pound and three and one-half pound sludges resulting from fuming acid treatment of a technical white oil were mixed with about 0.3 pound of sodium mahogany soap. This mixture was then hydrolyzed and the resulting liver separated from the weak acid. The liver was diluted with five volumes of water and sufficient lime-water slurry was added to totally neutralize the mixture and yield a two phase system. After discarding the top water phase approximately 0.7 part of catalytic cycle stock based on the amount of precipitate were added to the water-insoluble calcium sulfonate. The mixture was then agitated and dehydrated by air stripping at 185° to 190° F. down to a water content of about 3.5 percent, a one phase system being maintained throughout the dehydration procedure. Approximately 10 percent by volume of isopropyl alcohol was then added to the mixture to give the additive. A second portion of the same sludge was treated in the identical manner as set forth above except that no mahogany soap was added at any point. Upon addition of the catalytic cycle stock to the water-insoluble calcium sulfonate a two phase system existed which, as dehydration progressed resulted in a system which was was practically impossible to handle because of the high viscosity of the lower sulfonate layer.

Example III 15.4 pounds of a plant liver resulting from the hydrolysis of equal volumes of three pound and three and one-half pound sludges, produced in the fuming acid treatment of a technical white oil, were mixed with 2½ pounds of sodium mahogany soap. This mixture was heated to about 210° F. and steamed about one-half hour with 100 pounds open steam to remove the $SO_2$. About 85½ pounds of water were then added to the steamed mixture and the mixture was heated to about 180° F. with thorough mixing. The diluted liver was then neutralized with lime slurry consisting of 1.9 pounds of lime and about five pounds of water. Air agitation was applied throughout the entire addition of lime and for an additional hour thereafter to insure proper neutralization. After settling for about 10 minutes a two phase system existed from which the supernatant water phase was decanted. 23.7 pounds of water-insoluble calcium sulfonate resulted to which 17.8 pounds of catalytic cycled stock were added while thoroughly agitating same with air. The mixture was then dehydrated to 1.2 percent water by air stripping at 175° to 195° F. 0.4 pound of isopropyl alcohol were then added to 25 pounds of the dehydrated mixture and thoroughly blended therewith to yield an additive. An analysis of the material follows:

| | Per cent |
|---|---|
| Calcium sludge acid sulfonate | 20.1 |
| Calcium mahogany sulfonate | 2.9 |
| Catalytic cycle stock | 55.0 |
| Water | 1.2 |
| Isopropyl alcohol | 1.6 |
| Salts | 10.0 |
| Mineral oil | 9.2 |

A second portion of the same liver was processed in the same manner as above without the addition of mahogany soap at any point in the process; a two phase system existed during dehydration which rendered the mixture practically impossible to handle.

*Example IV*

A finished additive prepared in the manner described herein having a composition as follows:

| | Per cent |
|---|---|
| Calcium sludge acid sulfonate | 27.0 |
| Catalytic cycle stock | 47.9 |
| Water | 7.3 |
| Isopropyl | 6.2 |
| Salts | 0.2 |
| Mineral oil | 11.4 | was found to have a tendency to separate into two phases. Upon addition to the above additive, in an amount of about 2 percent by volume, of a mixture of calcium mahogany soap (1.6%) and sodium mahogany soap (.4%) a stable homogeneous system was obtained after agitating the mixture thoroughly.

The sulfonate composition of the herein described invention is especially well suited as an additive for oils and bituminous coating materials such as road oils, asphalts, etc. to promote adherence to wet mineral aggregates, and to prevent or reduce the tendency of such materials to stripping from mineral aggregates by water. The amount of the sulfonate composition to be used depends upon several factors, among which are the type of oil or bituminous materials employed, the area of the aggregate-bitumen interface, the characteristics of the aggregate material, the severity of the conditions of use, etc. It will be appreciated that these factors are interdependent to some extent, and that therefore the quantity of sulfonate composition which can be used most advantageously will be determined for the individual combination of bitumen and aggregate. In general the amount of sulfonate composition used to produce the best effects should be sufficient to produce a bitumen composition having from about 0.05% to about 10%, and preferably from about 0.5% to about 5%, of the 100 percent metal sulfonate, based upon the bitumen used.

Whereas the present invention has been described with particular reference to the use of preferentially water-insoluble sulfonic soaps derived from an acid sludge by the method taught in copending application for Letters Patent Serial No. 108,428, such soaps of preferentially water-soluble acids obtained from sludges by other known techniques may, likewise, be employed in accordance with the present invention.

Percentages given herein and in the appended claims are weight percentages unless otherwise stated.

We claim:

1. The method of preparing a stable homogeneous polyvalent metal sulfonate containing adjunct for bituminous materials which comprises recovering preferentially water-soluble sulfonic acids from sulfuric acid sludge, transforming said acids into preferentially water insoluble soaps by adding thereto a sufficient amount of an alkaline earth basic compound to neutralize said sulfonic acids, adding from about 25 percent to about 75 percent of a liquid aromatic hydrocarbon having a boiling point of at least about 220° F., adjusting the water content to not more than 35 percent, adding about 2 percent to about 15 percent of an alkanol containing from 2 to about 16 carbon atoms and adding from about 0.05 percent to about 18 percent of a preferentially oil-soluble sulfonic compound selected from the group consisting of mahogany acid and metal soaps of mahogany acids.

2. The method of claim 1 in which the aromatic hydrocarbon is an aromatic fraction boiling from about 400° F. to about 750° F., produced by the catalytic conversion of aliphatic hydrocarbons.

3. The method of claim 1 in which the alkanol is isopropyl alcohol.

4. The method of claim 1 in which the preferentially oil-soluble compound has an equivalent weight of from about 350 to about 600.

5. The method of preparing a stable homogeneous polyvalent metal sulfonate containing adjunct for bituminous materials which comprises recovering the preferentially water-soluble sulfonic acids from sulfuric acid sludge, adding a sufficient amount of an alkaline earth basic compound to neutralize said sulfonic acids, transforming said acids into preferentially water insoluble soaps by adding thereto from about 25 percent to about 75 percent of a catalytic cycle stock having an aromatic content of at least about 40 percent and having a distillation range between about 425° F. and about 460° F., adjusting the water content to from about 3 percent to about 10 percent, adding from about 2 percent to about 15 percent of an alkanol of from 2 carbon atoms to about 9 carbon atoms, and adding from about .05 percent to about 18 percent of a preferentially oil-soluble sulfonic compound selected from the group consisting of mahogany acids and metal soaps of mahogany acids.

6. The method of claim 5 in which the alkanol is isopropyl alcohol.

7. The method of claim 5 in which the preferentially oil-soluble sulfonic compound has an equivalent weight of from about 350 to about 600.

8. In the method of preparing a stable homogeneous polyvalent metal sulfonate-containing adjunct composition for bituminous materials which comprises diluting a sulfuric acid sludge which has been substantially freed of unreacted sulfuric acid with more than about 3 volumes of water to each volume of sludge, adding a sufficient amount of an alkaline earth basic compound to neutralize the sulfonic acids in said acid sludge, removing the supernatant liquid from the precipitated metal sulfonates, adding from about 25 percent to about 75 percent of a liquid aromatic hydrocarbon having a boiling point of at least about 220° F., dehydrating the mixture of metal sulfonates and aromatic hydrocarbon to a water content of not more than about 35 percent and adding to the dehydrated mixture from about 2 percent to about 15 percent of an alkanol containing from 2 to about 16 carbon atoms, the improvement which comprises the addition to said composition of from about .05 to about 18 percent of a preferentially oil-soluble sulfonic compound selected from the group consisting of mahogany acids and metal soaps of mahogany acids.

9. The method of claim 8 in which the preferentially oil-soluble sulfonic compound has an equivalent weight of from about 350 to about 600.

10. The method which comprises diluting sulfuric acid sludge which has been substantially freed of unreacted sulfuric acid, with more than about 3 volumes of water to each volume of sludge, adding a sufficient amount of an alkaline earth basic compound to neutralize the sulfonic acids in said hydrolyzed sludge, removing the supernatant aqueous liquid from the precipitated metal sulfonates, adding from about 25 percent to about 75 percent of a liquid aromatic hydrocarbon having a boiling point of at least about 220° F., dehydrating the mixture of metal sulfonates and aromatic hydrocarbon to a water content of not more than about 35 percent, adding to the dehydrated mixture from about 2 percent to about 15 percent of an alkanol containing from 2 to about 16 carbon atoms, adding from about 0.05 to about 18 of a preferentially oil-soluble sulfonic compound selected from the group consisting of mahogany acids and metal soaps of mahogany acids and incorporating the dehydrated mixture with a bitumen in an amount of from about 0.05 to about 10 percent by weight.

11. The composition comprising a bitumen and from about 0.5 percent to about 5 percent of a mixture consisting essentially of from about 10 percent to about 50 percent of a preferentially water-insoluble polyvalent metal sulfonate, prepared from preferentially water-soluble sulfuric acid sludge-sulfonic acids, from about 25 percent to about 75 percent of a liquid aromatic hydrocarbon having a boiling point above about 220° F., about 2 to about 15 percent of an alkanol containing from 2 to about 16 carbon atoms, not more than 35 percent water, from about 0.05 to about 18 of a preferentially oil-soluble sulfonic compound selected from the group consisting of mahogany acids and metal soaps of mahogany acids and up to about 30 percent hydrocarbon oil.

12. The composition comprising a bituminous hydrocarbon and from about 0.5 percent to about 5 percent of a mixture consisting essentially of from about 20 percent to about 30 percent of a preferentially water-insoluble calcium sulfonate prepared from preferentially water - soluble sludge sulfonic acids, from about 35 percent to about 60 percent of a solvent having a boiling point above about 200° F. and an aromatic content of at least about 40 percent, from about 4 percent to about 8 percent of an alkanol containing from 2 to about 9 carbon atoms, not more than 35 percent water, from 0.05 to about 18 percent of a preferentially oil-soluble sulfonic compound selected from the group consisting of mahogany acids and metal soaps of mahogany acids and from about 5 percent to about 10 percent hydrocarbon oil.

13. The composition of claim 12 in which the solvent is a catalytic cycle stock having an aromatic content of at least about 40 percent and a distillation range between about 425° F. and about 560° F.

14. The composition of claim 12 in which the solvent is a bottoms fraction of a catalytically reformed gasoline, said bottoms having a distillation range of from about 400° F. to about 750° F.

15. The composition of claim 12 in which the alkanol is isopropyl alcohol.

16. The composition of claim 12 in which the bitumen is a normally liquid petroleum oil residuum.

17. The composition of claim 12 in which the metal soap of the mahogany acid is sodium mahogany sulfonate.

18. The composition of claim 12 in which the metal soap of the mahogany acid is calcium mahogany sulfonate.

References Cited in the file of this patent

UNITED STATES PATENTS

| Number | Name | Date |
| --- | --- | --- |
| 1,695,197 | Merrill | Dec. 11, 1928 |
| 1,781,607 | Stamberg | Nov. 11, 1930 |
| 1,935,666 | Ramayya | Nov. 21, 1933 |
| 2,332,260 | Roediger | Oct. 19, 1943 |